US006728281B1

(12) United States Patent
Santori et al.

(10) Patent No.: US 6,728,281 B1
(45) Date of Patent: Apr. 27, 2004

(54) QUANTUM-DOT PHOTON TURNSTILE DEVICE

(75) Inventors: Charles Santori, Stanford, CA (US); Oliver Benson, Constance (DE); Yoshihisa Yamamoto, Stanford, CA (US); Matthew Pelton, Stanford, CA (US); Jungsang Kim, Basking Ridge, NJ (US)

(73) Assignees: The Board of Trustees of the Leland Stanford Junior University, Stanford, CA (US); Japan Science and Technology Corporation (JP)

( * ) Notice: Subject to any disclaimer, the term of this patent is extended or adjusted under 35 U.S.C. 154(b) by 140 days.

(21) Appl. No.: 09/780,679

(22) Filed: Feb. 9, 2001

Related U.S. Application Data
(60) Provisional application No. 60/181,956, filed on Feb. 10, 2000.

(51) Int. Cl.[7] ............................. H01S 5/00; H01L 29/06
(52) U.S. Cl. ................................ 372/45; 257/9; 257/13; 257/25
(58) Field of Search .......................... 372/44–45; 257/9, 257/13–14, 25

(56) References Cited

U.S. PATENT DOCUMENTS

| 4,933,728 | A | * | 6/1990 | Fukuzawa et al. ............ 257/13 |
| 5,841,151 | A | * | 11/1998 | Sahara ......................... 257/14 |
| 5,877,509 | A | * | 3/1999 | Pau et al. ..................... 257/14 |
| 6,191,431 | B1 | * | 2/2001 | Hoof et al. ................... 257/17 |
| 6,466,597 | B1 | * | 10/2002 | Kume et al. .................. 372/45 |

OTHER PUBLICATIONS

Yamamoto et al., "Single photonics: turnstile device and solid–state photomultiplier," Quantum Electronics Conference, 1998. IQEC 98. Technical Digest. Summaries of papers presented at the International, 1998, p. 172.*

Singh, Possibility of Room Temperature Intra–Band Lasing in Quantum Dot Structures Placed in High–Photon Density Cavities IEEE Photonics Technology Letters, vol. 8, No. 4, Apr. 1996, pp. 488–490.*

A. Imamoglu, *Turnstile Device for Heralded Single Photons: Coulomb blockade of Electron And Hole Tunneling in Quantum Confined p–i–n Heterojunctions*, Physical Review Letters, 72(2), pp. 210–213, Jan. 1994.

J. Kim, *A Single–Proton Turnstile Device*, Nature, vol. 397, pp. 500–503, 2/99.

C. Wiele, *Photon trains and lasting: the periodically pumped quantum dot*, The American Physical Society, 58(4), pp. R2680–2683, 10/98.

M. Pelton, *Ultralow threshold laser using a single quantum dot and microsphere cavity*, The American Physical Society, 59(3), pp. 2418–2421, 3/99.

* cited by examiner

*Primary Examiner*—Paul Ip
*Assistant Examiner*—James Menefee
(74) *Attorney, Agent, or Firm*—Lumen Intellectual Property Services, Inc.

(57) ABSTRACT

A quantum-dot photon turnstile device is capable of producing a stream of regulated and directed single pairs of photons with opposite circular polarizations. This device operates by injecting pairs of electrons and holes, alternately, into a single quantum dot, where they combine to form photons. The device will efficiently and reliably produce a directed beam of such photons at regular time intervals. It will be able to operate at high frequency and at high temperature. Such a stream of regulated photon pairs will be useful in quantum cryptography, quantum computing, low-power optical communications, as a light standard, and in many other areas of technology and fundamental science.

17 Claims, 15 Drawing Sheets

Fig. 2 (Prior Art.)

QUANTUM-DOT PHOTON TURNSTILE DEVICE

CROSS-REFERENCE TO RELATED APPLICATIONS

This application is based on Provisional application No. 60/181,956 filed Jan. 10, 2000 which is herein incorporated by reference.

STATEMENT REGARDING JST SPONSORED RESEARCH OR DEVELOPMENT

This invention was supported in part by grant number 93J006 from Japan Science and Technology Corporation (JST). The Japan Science and Technology Corporation has certain rights in the invention.

FIELD OF THE INVENTION

The present invention relates to the field of generation of quantum-mechanical states of light. In particular, it relates to the development of devices to produce a stream of regulated and directed single pairs of photons.

BACKGROUND ART

Recent progress in the field of quantum optics has enabled scientists to perform experiments that test the fundamental principles of quantum mechanics, which were previously only possible as thought experiments. Furthermore, scientists have come to realize that those fundamental principles can be exploited technologically. For example, there is growing interest in the new fields of quantum cryptography, quantum teleportation and quantum computing. These experiments require that a quantum system be prepared in a well-defined state. Out of the many candidate systems, single photons or pairs of photons have been most widely used.

The recently demonstrated scheme of quantum cryptography involves encoding information on the polarization of a single photon or pairs of polarization-entangled photons. Protection against eavesdropping is provided by the quantum-mechanical fact that measurement of the information will inevitably modify the state of the photon. The single-photon version of quantum cryptography (BB84 protocol) is vulnerable if more than one photon is sent by mistake, and therefore a stream of regulated single photon is needed. The entangled-photon-pair-version (Ekert protocol) does not have this vulnerability, but nevertheless, a compact source of regulated pairs of polarization-entangled photons would make this scheme more attractive as a method of rapid and secure communication.

Other technological applications are possible for a device that can generate regulatediphoton streams. For example, the regulated photon stream will have very stable intensity, with fluctuations well below those of standard light sources. The device could thus potentially see use as a high-precision light standard. It could also be applied in classical low-power optical communications networks. A stream of single photons at regular time intervals provides a rapid stream of bits, which can potentially be used to store information. This represents the lowest possible power consumption in optical communication: one photon per bit.

The principle sources of single photons in use are highly attenuated lasers, or light-emitting diodes (LED's). Optical pulses from the sources are reduced in intensity by absorption or reflection until each pulse contains, on average, less than one photon. Since the deletion of photons during attenuation is a random process, the number of photons in each pulse is also random. Many pulses will contain no photons, and some will contain more than one. This will limit the rate at which measurements can be done, and will also lead to errors in the experiments. It would be preferable to have a regulated source, where the number of photons in each pulse is well known.

Progress toward this goal was achieved by using single atoms, single trapped ions, or single molecules. An atom, or ion, or molecule was excited using a laser beam, and the resulting emitted light was observed. Because there is a certain amount of dead time between emissions of photons, the output photon flux is better regulated than for a laser or LED. In fact, if the exciting laser was pulsed in the right way, it would in principle be possible to obtain exactly one output photon per input pulse. However, these methods of producing regulated photons require complex and delicate experimental setups, and are thus not easily reproduced or used. Another difficulty in these methods is that the direction of photon emission is random. In other words, the photons fly in all directions, and are thus not easily collected and used in a subsequent experiment or system.

Another proposed source that overcomes the problem of random emission direction involves the use of strongly interacting photons in a nonlinear cavity. An optical cavity is used to enclose an atomic medium, which is exposed to a coupling laser beam that allows for strong non-linearity in the absence of loss. A pulsed laser beam is directed towards one end of the cavity. If the pulses have the correct shape, the output pulses from the other end of the cavity will each contain one, and only one, photon. This stream of regulated single photons will be directed in a well-known direction. However, the experiment setup is again quite complex and difficult to operate. It is thus difficult to incorporate into a large experiment or to use in a technological application.

One more proposed source involves pumping a quantum dot with a surface acoustic wave (SAW) ("Photon Trains and Lasing: The Periodically Pumped Quantum Dot" by C. Wiele et al., published in October 1998 in Physical Review A, vol. 58). The quantum dot is a small region of semiconductor material that can contain only one electron and one hole. The SAW is a periodic deformation that travels along the semiconductor surface. The wave can trap electrons and holes and move them along the surface. It may be possible to make the wave such that only one electron and one hole will be transported in each period. If the wave then passes over an appropriate quantum dot, the electron and hole will be trapped by the dot. They will then recombine to produce a photon. The photons will not be emitted in any particular direction. As well, it is not yet evident whether it will actually be possible to create a SAW such that each period contains exactly one electron and one hole. Finally, there will be errors in the output photon stream when the dot fails to trap both carriers.

A single photon turnstile device was realized in a mesoscopic double barrier p-i-n junction ("A Single-Photon Turnstile Device" by J. Kim et al., published in Feb. 11, 1999 in Letters to Nature, vol. 397, and "Turnstile Device for Heralded Single Photons: Coulomb Blockade of Electron and Hole Tunneling in Quantum Confined p-i-n Heterojunctions" by A. Imamoglu, published in Jan. 10, 1994 in Physical Review Letters, vol. 72). Regulated single photons were produced using a combination of simultaneous Coulomb blockade effect for electrons and holes and resonant tunneling in a mesoscopic p-n junction. The structure generally comprises of an intrinsic central quantum well (QW) in the middle of a p-n junction, and n-type and p-type side quantum wells (QWs) isolated from the central QW by tunnel barriers (FIG. 1a). The lateral size of the device is reduced to increase the single-particle charging energy $e^2/2C_i$ where $C_i$ (i=n or p) is the capacitance between the central QW and the side QWs. The device is designed such that the electron and hole tunneling conditions are separated in applied bias voltage, and thus can be controlled independently. The electron resonant tunneling condition into an electron sub-band in the central QW is satisfied at a certain bias voltage $V_0$. When an electron tunnels, the Coulomb blockade effect shifts the electron sub-band energy off of resonance, so that the subsequent electron tunneling is inhibited (FIG. 1b). Then the bias is increased to $V_0+\Delta V$ to satisfy the hole resonant tunneling condition. If a single hole tunnels into the hole sub-band of the central QW, the subsequent hole tunneling is inhibited due to the Coulomb blockade effect for holes. By modulating the bias voltage between the electron and the hole resonant tunneling conditions periodically, it is possible to inject a single electron and a single hole into the central QW periodically, if the tunneling time is much shorter than the pulse duration. If the radiative recombination time of an electron-hole pair is also much shorter than the pulse duration, one (and only one) photon is emitted per modulation period.

A GaAs/AlGaAs three-QW structure sandwiched by n-type and p-type AlGaAs bulk layers was grown by molecular beam epitaxy.

Post structures with diameters of 200 nm–1.0 μm were made by electron-beam lithography followed by metal evaporation, lift-off, and $BCl_3$/Cl ECR plasma etching. The surface of the device was passivated with sulfur in $(NH_4)_2S$ solution, and encapsulated with a silicon nitride film. Finally, the structure was planarized with hard-baked photoresist, and bonding pads were evaporated. The top semi-transparent metal served as the p-type contact from which an emitted photon was detected, and the n-type contact was formed in the substrate. The device was installed in a dilution refrigerator with a base temperature of 50 mK and biased with DC and square wave AC voltages. The emitted photons were detected by a silicon solid-state detector. FIG. 2a shows a histogram of the measured time intervals between the rising edge of the driving pulse and the photon detection. The data show that the emitted photons follow the rising edge of the driving pulse, as expected.

Unfortunately, the turnstile device described above exhibits low detection efficiency of generated photons due to the low escape probability of the photons from the structure. The substrate is opaque for the emitted light and photons must pass through opaque metal contacts. Consequently, only a small fraction of the generated photons ($2\times10^{-3}$) reach the photodetector.

Furthermore, a considerable background leakage current produces non-regulated photons. The leakage current is due mainly to the fact that the electron tunneling cannot be fully suppressed at a high bias voltage when only holes should be allowed to tunnel. This is because the peak-to-valley ratio of the resonant tunneling structure was finite. Due to the first two items, the photon states that are generated by the device are a stream of single photons with their time intervals only slightly more regular than those of a random Poissonian source.

Prior art photon turnstile devices also exhibit low modulation frequency. As can be derived from FIG. 2, the photon recombination time in the present device was 30 nsec. This limits the modulation speed to below 10 MHz. In addition prior art devices typically require low operation temperatures. In a turnstile device, which relies on Coulomb blockade, the thermal energy fluctuations must not exceed the Coulomb blockade energy shift. This energy shift is determined by the device capacitance and therefore requires the very low temperatures in the experiment described above.

Development of sources of polarization-entangled photon pairs has occurred slowly over the last few decades. The atomic cascade method, developed in the early 1980's, uses a special two-photon decay process in atoms such as calcium. Although the photons are emitted in all directions, polarization entanglement is perfect only when two photons from a pair are emitted in the same or opposite directions. Spontaneous parametric down conversion, developed in the mid-1980's, uses a nonlinear crystal to convert pump photons into entangled photon pairs. Although this method can generate entangled photon pairs at a decent rate, the number of pairs produced cannot be precisely controlled, but rather follows a Poisson distribution.

There is a need, therefore, for a quantum-dot photon turnstile device that overcomes the above difficulties.

OBJECTS AND ADVANTAGES

It is an object of the present invention to generate pairs of polarization-correlated or polarization-entangled photons. It is another object of the invention to provide a quantum-dot photon turnstile device having a high probability of escape for generated photons. It is a further object of the invention to provide a quantum-dot turnstile device that exhibits low production of non-regulated photons. It is another object of the invention to provide a quantum-dot turnstile device that exhibits high modulation frequency operation. It is an additional object to provide a photon turnstile device capable of high temperature operation.

SUMMARY

A quantum-dot photon turnstile device includes a quantum dot embedded in a resonant tunneling barriers, and an external optical cavity coupled to the quantum dot. The resonant tunneling structure includes an intrinsic semiconductor disposed between a heavily-doped p-type semiconductor layer and a heavily-doped n-type semiconductor layer. The quantum dot is embedded in the intrinsic semiconductor layer. The dot has an average base width of roughly 20 nanometers and a height of roughly 4 nanometers. The intrinsic material surrounding the quantum dot forms tunnel barriers, which separate the electron reservoir, i.e., the n-type semiconductor layer, and the hole reservoir, i.e., the p-type semiconductor layer, from the quantum dot.

According to an exemplary embodiment, the device is capable of producing a regulated and directed stream of single pairs of photons with opposite circular polarizations. The device is first biased at an electron bias voltage $V_e$ such that two electrons with opposite, spins can tunnel into the initially empty quantum dot. Further electron tunneling is now suppressed due to the Pauli exclusion principle, since the ground state is filled and the next available electron state, the first excited state, is far off of resonance. Then the device is bias at a hole bias voltage $V_h$ such that two holes with opposite spins can tunnel into the dot. Again, further hole tunneling is suppressed due to Pauli exclusion principle since the hole ground state is filled and the first excited hole state is off of resonance. Once two holes have tunneled, two electrons recombine with two holes as dictated by selection rules, producing a pair of photons with opposite circular polarizations. From here, the cycle is repeated. Thus, modulating the bias voltage between $V_e$ and $V_h$ produces a regulated stream of photons, where two photons are emitted per modulation cycle. The emission frequency of the single pairs of photons can be changed by adjusting the voltage modulation frequency.

For polarization anticorrelation to be observed, the spin-relaxation times for electrons and holes in the dot must be longer than the electron-hole recombination time (true for typical semiconductors), and the recombination time must be much longer than the hole tunneling time. Therefore, the electron bias voltage $V_e$ and hole bias voltage $V_h$ are selected to maximize the tunneling probabilities of two electrons and two holes into the quantum dot. Furthermore, the doping level of the n-type and p-type semiconductor layer and the thickness of the intrinsic tunnel barriers are controlled to ensure that the hole tunneling time is longer than the recombination time. If the spin-dephasing rate for electrons and holes is slow enough, then the emitted photons will also have entangled polarizations.

The optical cavity directs the emitted photons into a single electromagnetic mode. Without such a cavity, the spontaneously-emitted photons would leave randomly in all directions. The cavity typically comprises a pair of reflectors placed on opposite sides of the quantum-dot structure, such as distributed-Bragg-reflector cavity or Fabry-Perot cavity. Alternatively, the cavity can be a microsphere cavity, a simple post with or without a metal coating, or a photonic bandgap structure.

DETAILED DESCRIPTION

Figure 1:
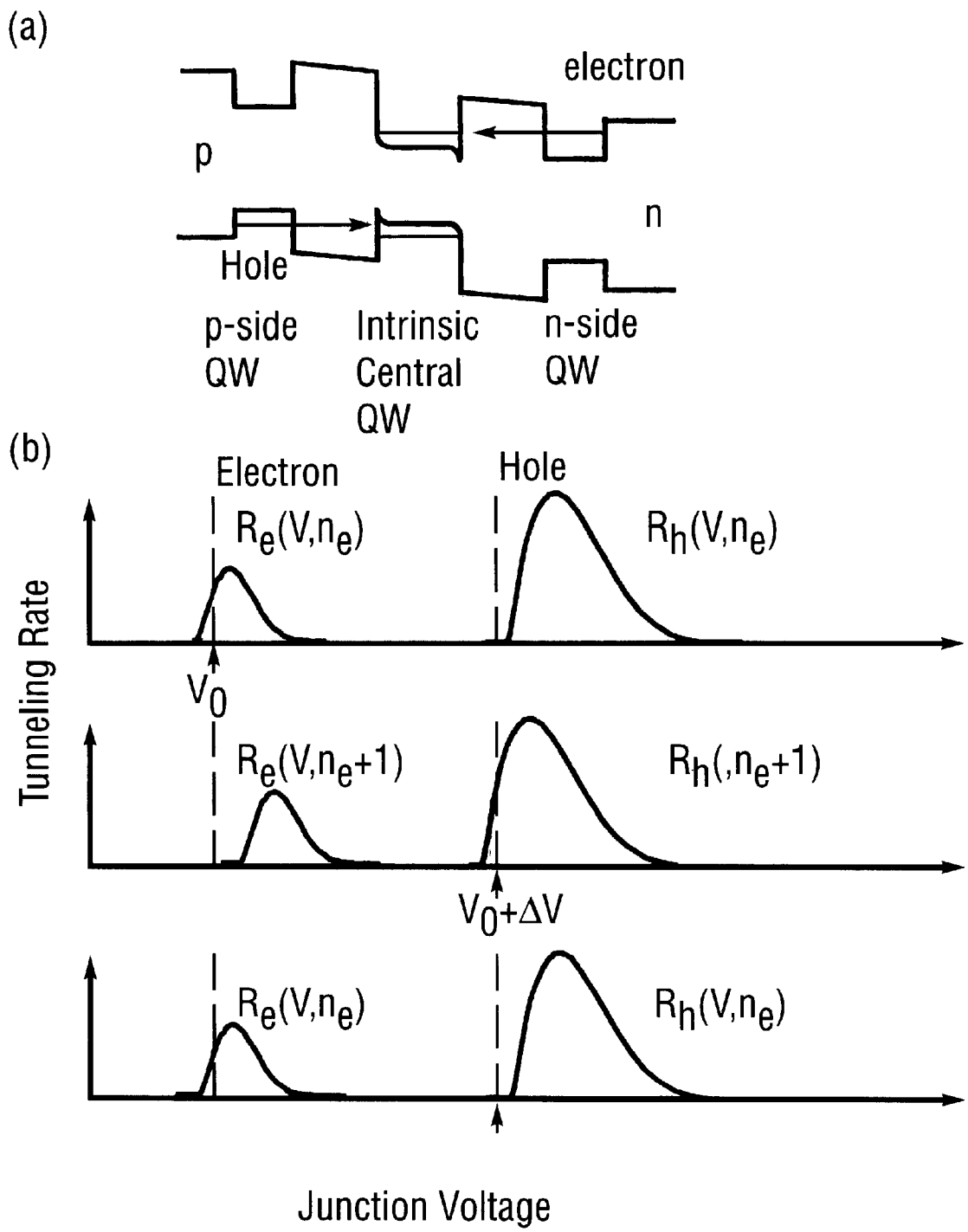
FIG. 1a is a band diagram showing the central quantum well and the side quantum wells of a single-photon turnstile device of the prior art.
FIG. 1b shows three plots illustrating the tunneling rates of the single electron and single hole as a function of the bias voltage when using the single-photon turnstile device of FIG. 1.
Figure 2:
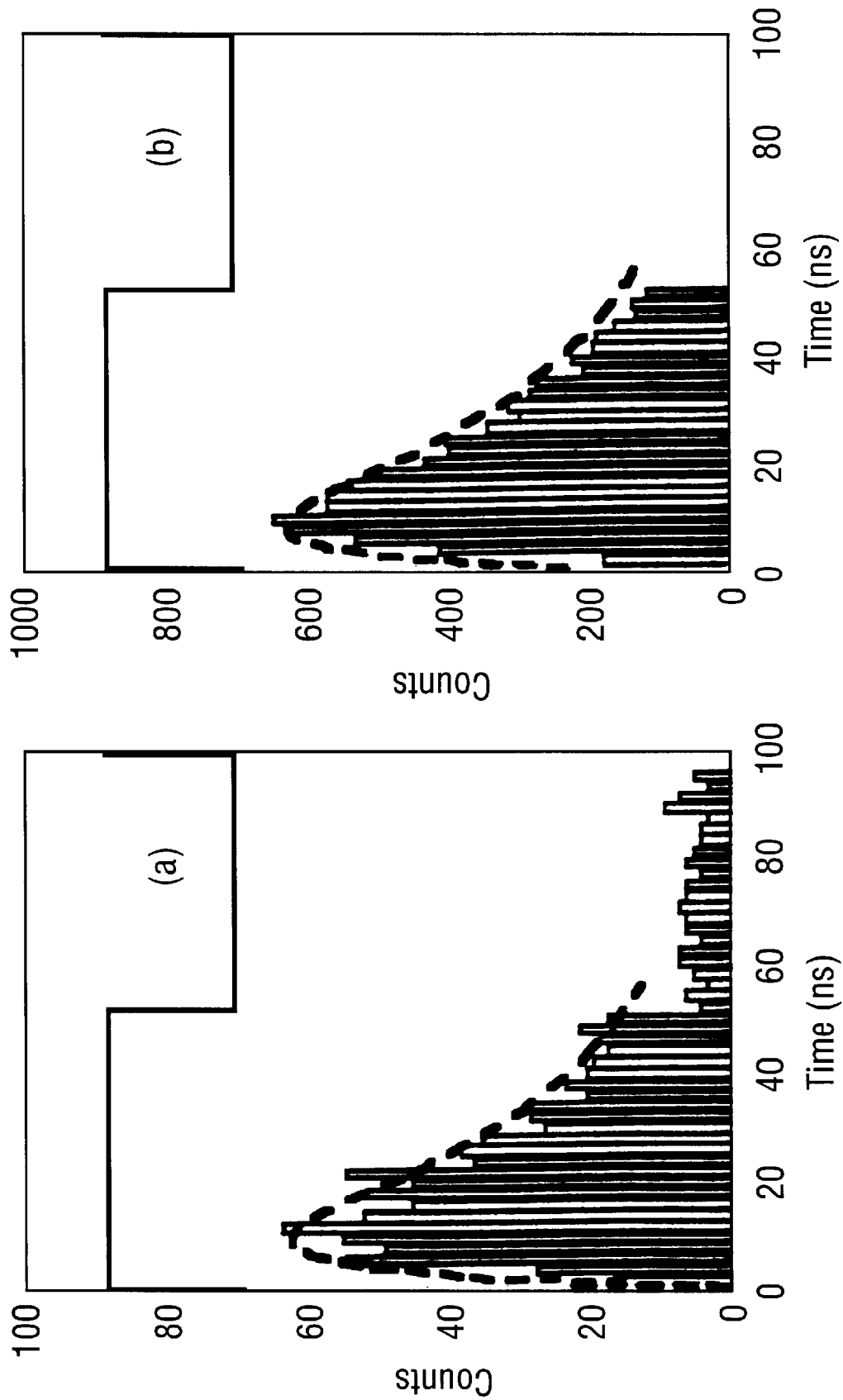
FIGS. 2a–b shows the histograms of the measured time delay between the rising edge of the modulation input and the photon detection resulting from the single-photon turnstile device of FIG. 1.
Figure 3:
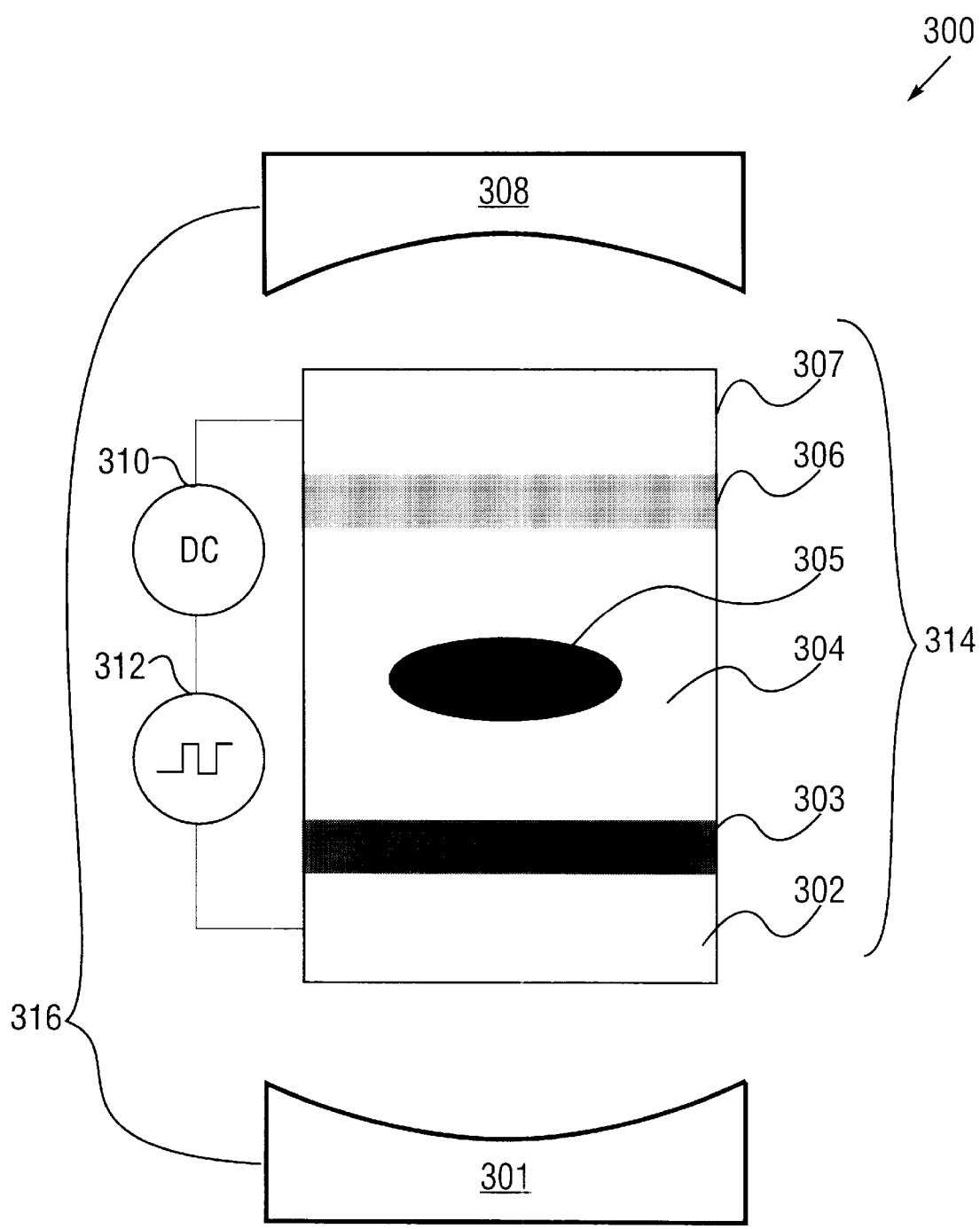
FIG. 3 is a schematic diagram of a structure of a quantum-dot photon turnstile device according to a preferred embodiment of the present invention.

FIG. 3 depicts a schematic diagram of the overall structure of an exemplary quantum-dot photon turnstile device 300 according to the present invention. The device 300 includes a quantum dot 305 embedded in a resonant tunneling structure 314, which is coupled to an external cavity 316 typically consisting of two reflectors 301 and 308. The resonant tunneling structure 314 includes an intrinsic semiconductor layer 304 disposed between a heavily-doped p-type semiconductor layer 307, which acts as a hole reservoir, and a heavily-doped n-type semiconductor layer 302, which acts as an electron reservoir. The p-type and n-type semiconductor layers 307 and 302 are made of the same material. The quantum dot 305 is embedded in the intrinsic layer 304. The intrinsic material surrounding the quantum dot 305 forms tunnel barriers 303 and 306, which separate the electron reservoir 302 and hole reservoir 307 from the quantum dot 305. The electron reservoir 302 and the hole reservoir 307 are biased with a DC voltage 310 that is modulated by a modulator 312.

The quantum dot 305 is where photons are generated. A quantum dot is an artificial structure in which an electron or hole is confined to a region so small that quantum mechanical effects dominate. As in an atom, energy takes on discrete values for different quantum states. The Pauli exclusion principle limits the occupancy of each quantum state to unity. In addition, electrostatic repulsion between particles of the same type gives rise to a charging energy that is required to place an additional particle into the dot (Coulomb blockade). In the device 300, Pauli exclusion and Coulomb blockade can both contribute to a situation where electrons or holes outside of the tunnel barriers 303 and 306 must have successively greater energies to enter the dot 305.

Resonant tunneling allows one to regulate the flow of the electrons or holes into the quantum dot based on whether the energy of a particle outside the barrier matches the energy of an empty quantum state inside of the dot. Ordinary tunneling is the process by which an electron, viewed as a wave, can pass through a barrier in which it would be forbidden according to classical physics. Typically, the probability for tunneling decreases exponentially with barrier thickness. In resonant tunneling, however, the tunneling rate can be greatly enhanced if the electron wave experiences constructive interference inside of a confining structure on the opposite side of the barrier. This constructive interference only occurs when the energy of a quasi-bound state inside the confining structurelmatches the energy of the electron outside of the barrier. In the device 300, electron and hole tunneling can be switched in and out of resonance with the quantum dot energy levels by changing the bias voltage. Provided that the tunneling resonances for electrons and holes occur at different bias voltages, electron and hole flow into the quantum dot can be turned on at separate times.

The optical cavity 316 causes the photons to be emitted in a single direction, allowing for high collection efficiency. If the cavity has sufficiently high finesse, and is tuned to the wavelength of the emitted photons, the probability of spontaneous emission into a single cavity mode is greatly enhanced, so that almost all of the photons will be emitted into that mode. Photons leave the device 300 through the reflector 301, which by design has a small transmission.

Figure 4:
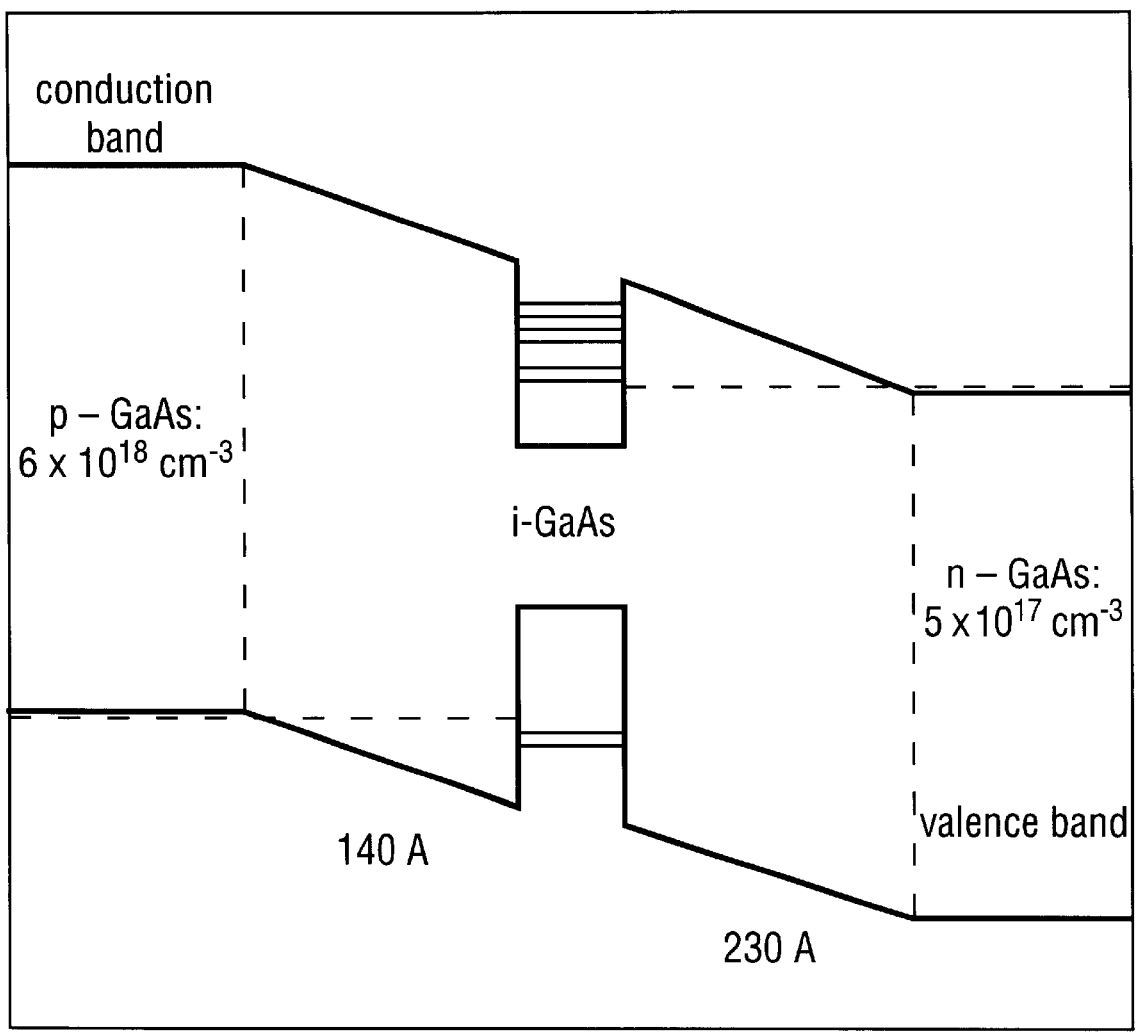
FIG. 4 is an energy band diagram showing the active region in accordance with the quantum-dot photon turnstile device of FIG. 3.

FIG. 4 shows an energy band diagram for the active region in accordance to the quantum-dot photon turnstile device 300 of FIG. 3. In FIG. 4, the quantum dot is embedded in an intrinsic (undoped) semiconductor layer of GaAs, which is disposed between a heavily-doped p-type semiconductor layer of the same material (i.e., p-GaAs)., and a heavily doped n-type semiconductor layer of the same material (i.e., n-GaAs). The intrinsic material (i.e., i-GaAs) surrounding the quantum dot forms triangular tunnel barrier potentials. Electrons from the n-type reservoir (right) and holes from the p-type reservoir (left) are sometimes allowed to tunnel through the intrinsic tunnel barriers into the quantum dot (center), depending on the bias voltage. Resonant tunneling is only allowed when energy is conserved.

Figure 5:
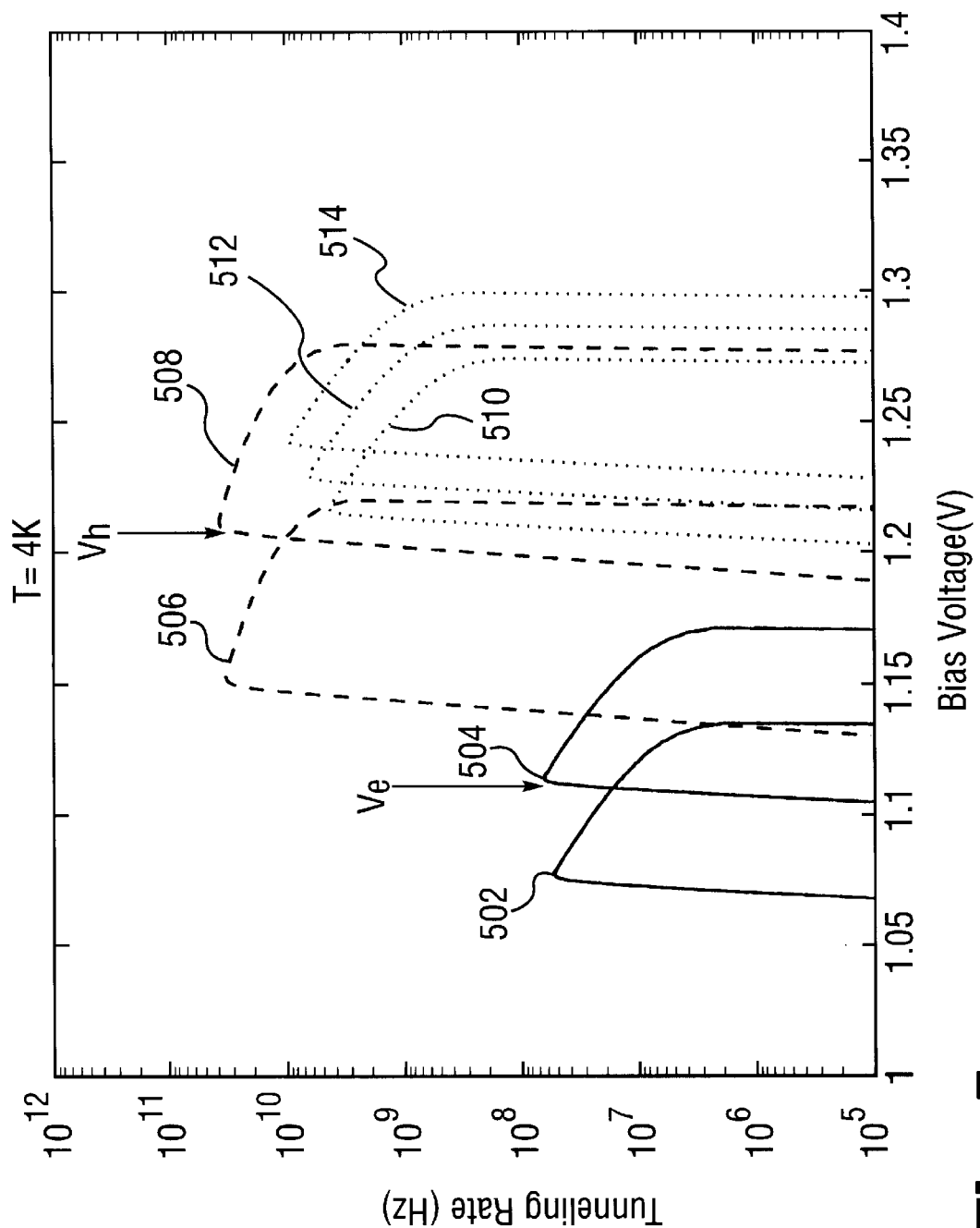
FIG. 5 is a graph illustrating the calculated tunnel rates of the electron and hole as a function of the bias voltage for a design example given for the preferred embodiment of the invention.

FIG. 5 is a graph illustrating the calculated tunnel rates of the electron and hole as a function of the bias voltage for the specific case of an InAs self-assembled quantum dot imbedded in the intrinsic region of a GaAs p-i-n structure. The left solid curve 502 shows the rate for an electron to tunnel into the electron ground state with zero electrons in the dot. The right solid curve 504 shows the rate for an electron to tunnel into the electron ground state with one electron already in the dot. The dashed curve 506 shows the rate for a hole to tunnel into the hole ground state with two electrons and zero holes already in the dot. The dashed curve 508 shows the rate for holes to tunnel into the hole ground state with two electrons and one hole already in the dot. The dotted curves 510, 512, 514 show rates for electrons to tunnel into the first electron excited state with two (right dotted curve 514), one (middle dotted curve 512), and zero (left dotted curve 510) electrons already in the dot. The difference in the widths of electron and hole tunneling resonances is due to the asymmetric tunnel barriers and doping levels.

Turnstile operation is achieved by modulating the bias voltage between $V_e$ and $V_h$. A typical InAs quantum dot has a ground-state Coulomb blockade energy of about 20 meV, and the separation between the electron ground and first excited states is about 90 meV. The thicknesses of the intrinsic tunnel barriers on either side of the dot are chosen so that the resonant tunneling of electrons into the electron ground state (solid curves 502, 504), of holes into the hole ground state (dashed curves 506, 508), and of electrons into the first electron excited state (dotted curves 510–514) occur at well-separated bias voltages. In the present structure, the n-side barrier is 230 angstroms thick, while the p-side barrier is 140 angstroms thick. The doping in the n-type layer is $5 \times 10^{17}$ cm$^{-3}$, while the doping in the p-type layer is $6 \times 10^{18}$ cm$^{-3}$.

In an exemplary embodiment of the present invention, the quantum-dot photon turnstile device 300 can emit single pairs of photons with opposite circular polarizations. This mode of operation can occur when Pauli exclusion alone is used to regulate the entry of electrons and holes into the dot 305. In this case, electrons fill the electron lowest-energy state two-at-a-time, one with spin ½ and one with spin -½.

Similarly, heavy holes can fill the hole ground state two-at-a-time, one with spin 3/2, and the other with spin -3/2. If two electrons and two holes are present in the dot at the same time, selection rules dictate that the spin ½ electron must combine with the spin 3/2 hole, producing a photon with right-handed circular polarization, while the spin -½ electron must combine with the spin -3/2 hole, producing a photon with left-handed circular polarization.

Figure 6:
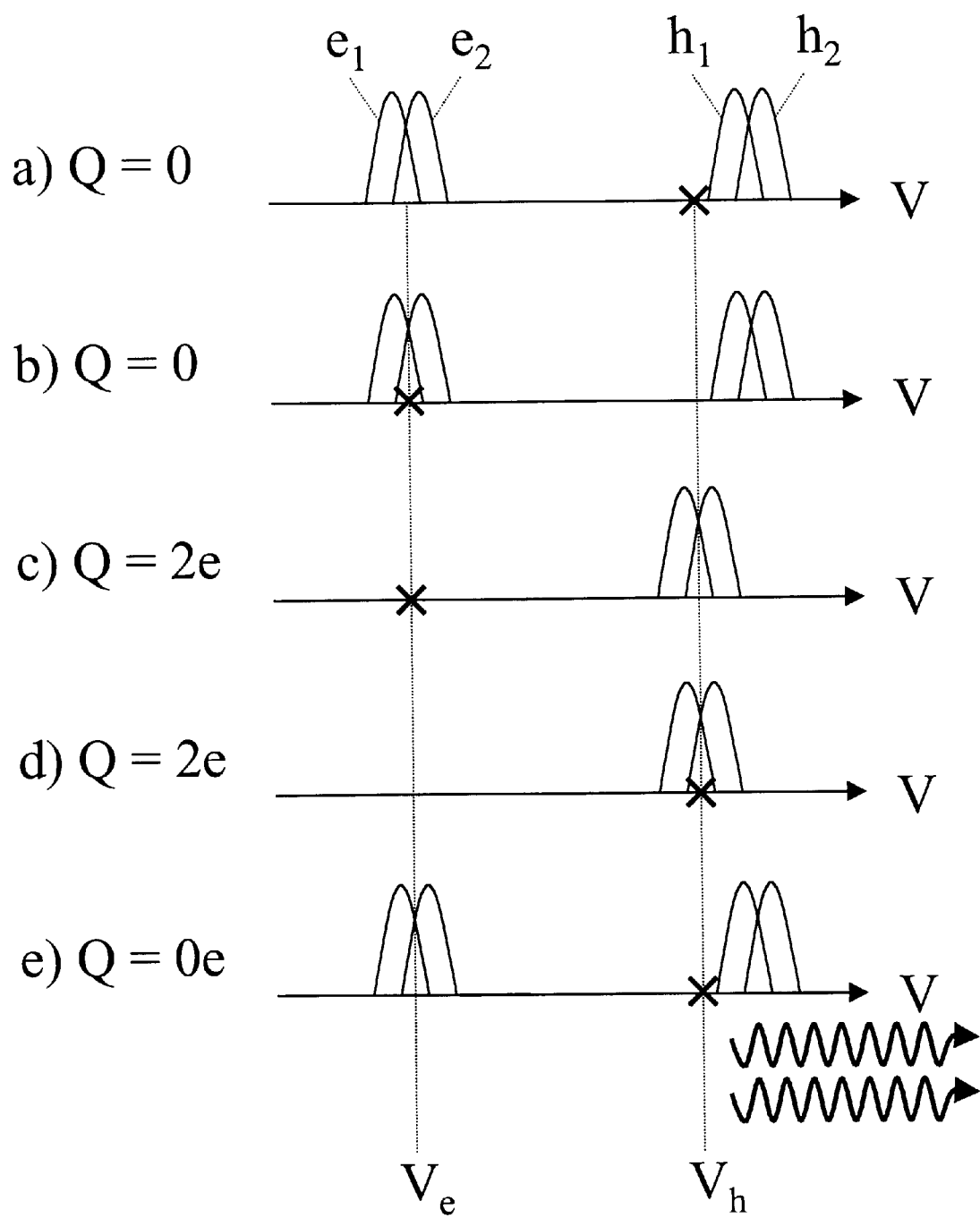
FIGS. 6a–e shows an operation principle of the quantum-dot photon turnstile device of the present invention.

FIGS. 6a through 6e shows the operation principle of the quantum-dot photon turnstile device 300. FIG. 6a shows that the dot begins with no electrons or holes inside. The bias is first lowered to $V_e$ so that two electrons can resonantly tunnel, which is shown in FIG. 6b. Given an electron mean tunneling time of 25 nanoseconds, after waiting 100 nsec, the probability is near unity that the dot contains two electrons. FIG. 6c shows that a third electron cannot tunnel because the ground state is full, due to Pauli exclusion. in FIG. 6d, the bias voltage is raised to $V_h$ to allow two holes to resonantly tunnel. The holes enter the dot and recombine with the electrons, producing a pair of photons with opposite polarization. Given a hole mean tunneling time of 0.1 nsec, the probability is near unity that, after 100 nsec, two holes have entered the dot. However, the hole tunneling time is short enough compared to the electron-hole recombination life time (0.5 nsec) that, usually, the second hole will enter the dot before the first hole recombines with an electron. Under this condition, the emitted photons may have anticorrelated or even entangled polarizations. A third hole cannot tunnel in due to Coulomb blockade, as shown in FIG. 6e. A third electron still cannot tunnel in as long as the peak-to-valley ratio for the electron tunneling resonance is high; ratios as high as 130:1 have been reported for other resonant tunneling structures. From here, the cycle repeats. Thus, a single pair of photons is produced every modulation cycle, or every 200 nanoseconds.

For polarization anticorrelation to be observed, the spin-relaxation times for electrons and holes in the dot must be longer than the electron-hole recombination time (true for typical semiconductors), and the recombination time must be much longer than the hole tunneling time. Therefore, the electron bias voltage $V_e$ and hole bias voltage $V_h$ are selected, as showed in FIG. 5 to maximize the tunneling probability of two electrons and two holes into the quantum dot. Furthermore, the doping level of the n-type and p-type semiconductor layer and the thickness of the intrinsic tunnel barriers are controlled to ensure that the hole, tunneling time is shorter than the recombination time. If the spin-dephasing time is, slow, it may even be possible to generate quantum entanglement between the two photons.

The photon emission frequency can be changed within some range by simply adjusting the voltage modulation frequency. The upper limit is determined by the tunnel barrier thicknesses (design parameters), which determine the electron and hole tunneling rates. The lower limit is determined by the peak-to-valley ratio of the electron tunneling resonance, which determines how long one may wait while biased at the hole tunneling resonance before an unwanted electron will find its way into the dot. The upper limit need not be 5 MHz as in this design. By making the tunnel barriers thinner, the electron tunneling rate can be made arbitrarily small, and the only limits on operation frequency are the electron-hole recombination time in the dot (650 picoseconds without a cavity, and less with a cavity) and the speed of the electronics used to drive the device. Thus, with suitable electronics, operation frequencies of 1 GHz or faster are possible.

Successful operation does not depend critically on a good peak-to-valley ratio for the electron tunneling resonance. If an asymmetric modulation cycle is used, the only condition necessary for reliable operation is that the hole tunneling rate be much faster than the electron tunneling rate when the device is biased for hole tunneling. For example, suppose that the mean electron tunneling time is 25 nanoseconds at the electron resonance, and it is also 25 nanoseconds at the hole resonance. Suppose that the mean hole tunneling time is again 0.1 nanosecond at the hole resonance. If the modulation cycle includes a 100 nanoseconds interval biased at the electron resonance, followed by a 1 nanosecond interval biased at the hole resonance, then near-perfect operation can be obtained with almost no requirements on peak-to-valley ratios.

More elaborate Structures can be imagined. For example, the tunnel barriers could include AlGaAs barriers. This would allow independent control over tunnel rates and the bias voltages at which tunneling occurs. The n type and p-type reservoirs could be replaced by InGaAs quantum wells. This would allow for narrower electron and hole distributions, leading to sharper tunneling peaks, as well as another way to control the bias voltages at which tunneling occurs.

Ideally, the quantum-dot turnstile device emits photons into only one mode of the electromagnetic field. Manipulation of the spontaneous emission rate and the spatial emission pattern is achieved by inserting a photon emitter into a high-finesse cavity. Thus, it is desirable to couple the photons emitted from the quantum-dot photon turnstile device to such a high-finesse cavity in order to enhance the emission into a particular mode. Micropost cavities as well as photonic bandgap structures provide ideal three-dimensional photon confining structures that can be used for such purposes.

Figure 7:
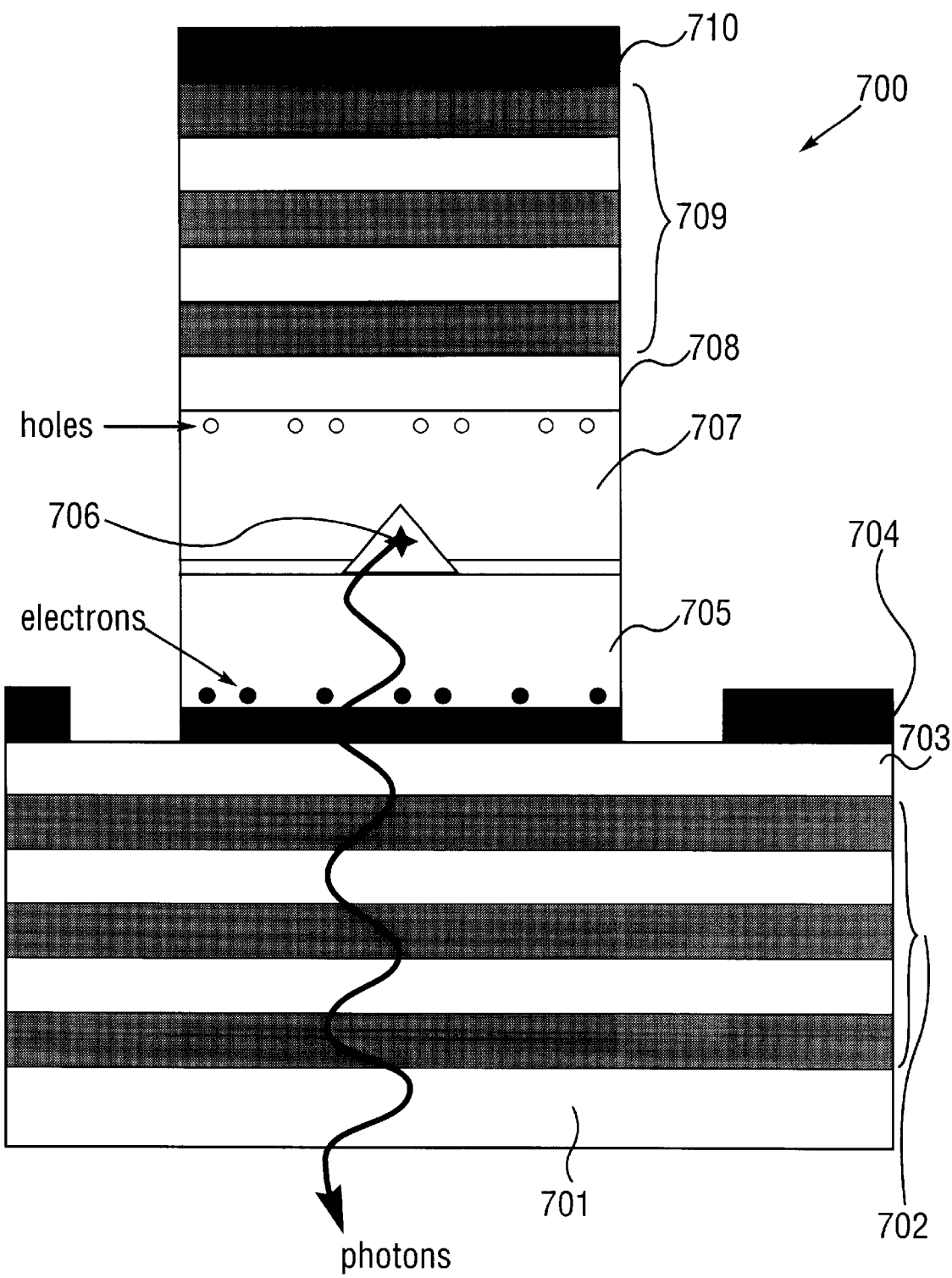
FIG. 7 is a schematic diagram of the single quantum-dot turnstile device implemented in a micropost distributed-Bragg-reflector (DBR) cavity.
Figure 8:
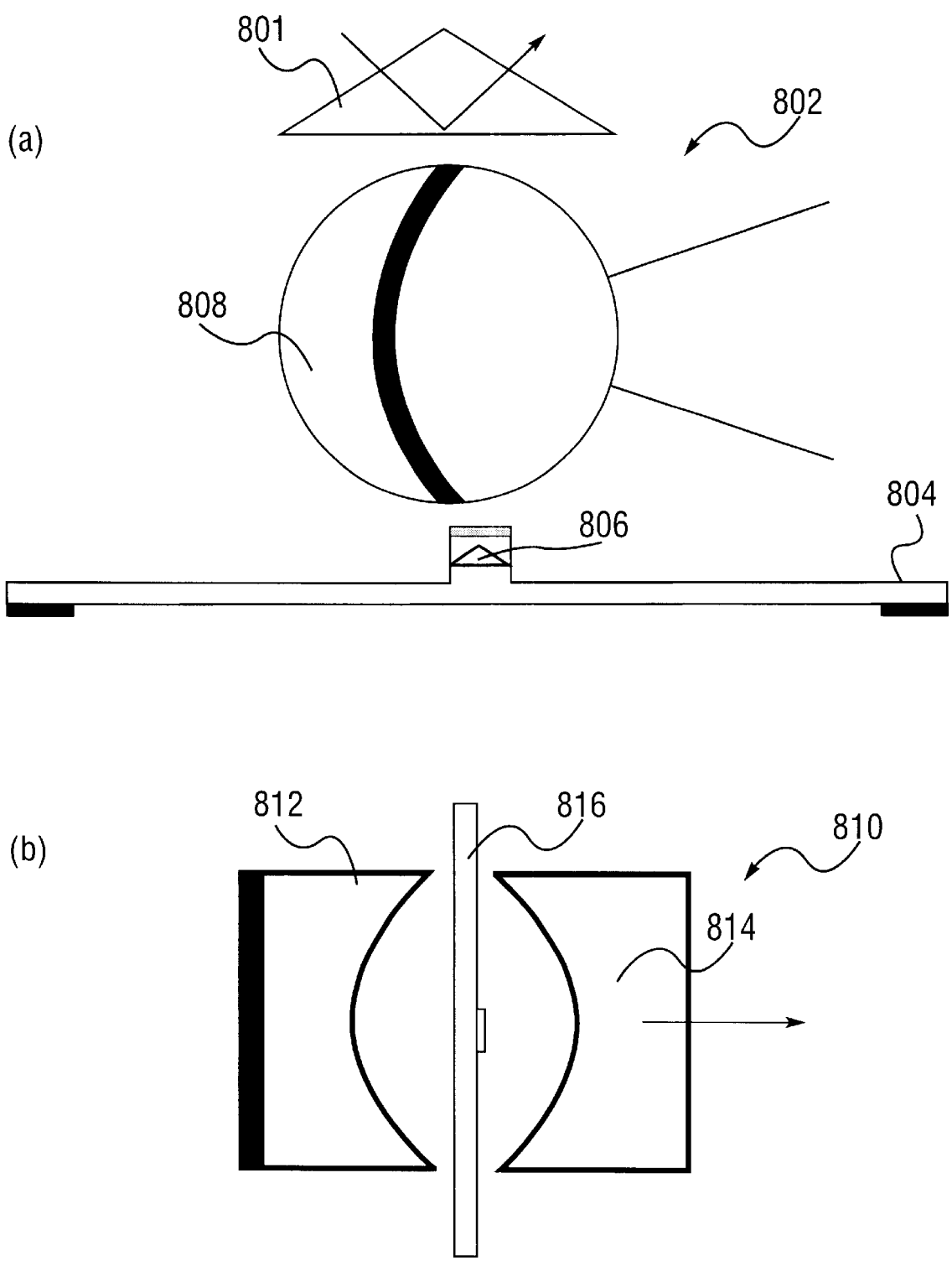
FIGS. 8a–b shows two alternative cavities to be used in the quantum-dot photon turnstile of the present invention.

FIG. 7 is a schematic diagram of an apparatus 700 with the quantum-dot turnstile device implemented in a micropost distributed-Bragg-reflector (DBR) cavity. As shown in FIG. 7, an InAs quantum dot 706 is placed between two intrinsic gallium arsenide tunnel barriers 705 and 707, through which electrons and holes are injected from the n-type reservoir 703 and p-type reservoir 708. The entire structure is sandwiched between two distributed-Bragg-reflector (DBR) mirrors 702 and 709, which include layers of dielectric material with alternating high and low indices of refraction form highly reflective mirrors above and below the active region to channel the emitted photons into a single electromagnetic mode. Such cavities can be made along with the active region in a single epitaxial growth. Alternatively, the turnstile device can be coupled to an external high-finesse optical cavity as shown in FIG. 8. Furthermore, the device 700 also includes two Ohmic contacts 704 and 710 and a gallium arsenide substrate 701.

FIGS. 8a–b shows two alternative types of cavities to be used in the quantum-dot photon turnstile device of the present invention, which are a microsphere cavity and a Fabry-Perot-type cavity. As shown in FIG. 8a, the microsphere cavity 802 generally includes a small glass sphere 808 suspended above a GaAs substrate 804 containing the active region of a quantum-dot photon turnstile device 806 disposed on it. Photons generated in the device 806 are directed into whispering-gallery modes, which propagate along the surface of the microsphere 808. These photons can be extracted from another point along the surface of the microsphere 808 through a prism output coupler 801.

In FIG. 8b, a Fabry-Perot cavity 810 typically includes two external mirrors 812 and 814 held on opposite sides of the substrate 816 containing the active region of a quantum-dot photon turnstile device 818. Photons generated in the device 818 are directed into electromagnetic modes confined between the two mirrors 812, 814, and can escape through the top mirror.

Three more alternative cavity structure, not shown in FIG. 8, are also possible. One possibility is a simple post structure consisting of just an etched cylinder of semiconductor, including the quantum dot, tunnel barriers and doped layers, but lacking the DBR mirrors. Due to the large index of refraction difference between a typical semiconductor and the surrounding air (or protective coating, if applied), the post may act as a waveguide, channeling as much as 80% of the emitted light out the top of the post and into a single transverse mode for efficient collection. An improvement on the simple post would be a metal-coated post, where the metal insures that no light at all can escape out the side of the post. A dielectric buffer layer in between the post and the metal would serve to reduce Ohmic losses in the metal. A third possible cavity structure is a photonic bandgap lattice. Such a cavity consists of a defect in a periodic dielectric structure (the period is on the order of the optical wavelength) with the geometry designed such that certain wavelengths of light cannot propagate. For example, a two-dimensional photonic bandgap structure, consisting of a periodic array of posts, might be used to suppress leakage out the side of the post containing the turnstile device.

The fraction of the spontaneous emission into one mode of the cavity of the described structures can be dramatically enhanced and approaches unity for ideal conditions. These structures thus emit regulated single pairs of photons into a single mode of the electromagnetic field.

The quantum-dot photon turnstile device can be fabricated using existing epitaxy and nanofabrication technologies. The epitaxial methods used to make a layered structure containing quantum dots sandwiched between tunnel barriers and doped reservoirs, as well as the methods used to isolate single dots and to contact the structures electrically are described below.

Figure 9:
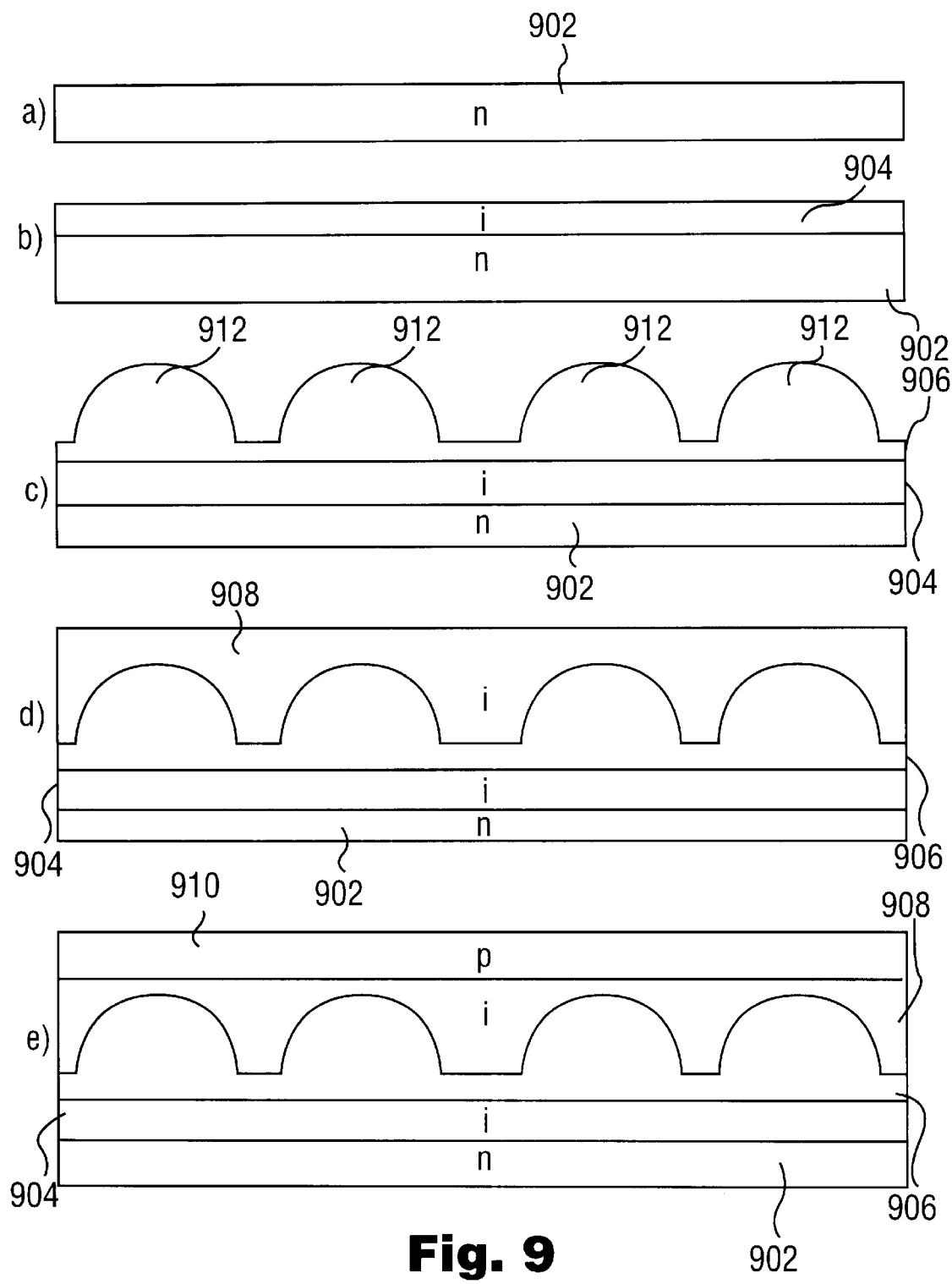
FIGS. 9a–e are schematic diagrams showing series of processing steps involved in fabricating self-assembled quantum dots grown by molecular beam, epitaxy in the Stransky-Krastanove mode of crystal growth.
FIG. 9f shows an atomic-force-microscope image of several self-assembled indium arsenide/gallium arsenide quantum dots fabricated by method of FIGS. 9a–e.

The quantum-dot photon turnstile device of the present invention can use any quantum dot that is capable of emitting light quickly and efficiently, and which can be incorporated into a resonant-tunneling semiconductor structure for electrons and holes. One particular type of quantum dot that will work well in the device is a self-assembled semiconductor quantum dot made through, the Stranski-Krastanov mode of crystal growth as shown. in FIGS. 9a–e. In this growth process, a n-type semiconductor layer 902 is first deposited as shown in FIG. 9a. A first intrinsic semiconductor layer 904 is deposited on the layer 902 as shown in FIG. 9b. A layer of dot material 906 is epitaxially grown on layer 904 as shown in FIG. 9c. The material of the layer 906 has a smaller inter-atomic spacing. (lattice constant) than the material of the layer 904. The atoms of the layer 906 are compressed relative to their natural spacing, which leads to strain. In order to reduce this strain, the epitaxial material spontaneously forms small hills, or islands 912 as shown in FIG. 9c. A second intrinsic semiconductor layer 908 is grown on the dot layer 906, which results in small inclusions, or dots 912 as shown in FIG. 9d. The material of intrinsic semiconductor layer 908 and layer 904 are the same. A p-type semiconductor layer 910 is then deposited on top of the layer 908 as shown in FIG. 9e. Growth can be done using any high-quality epitaxial, deposition method, such as molecular beam. epitaxy (MBE) or metallo-organic chemical vapor deposition (MOCVD). For many material systems, such as Inas/GaAs, Ge/Si, InGaN/GaN, and InP/GaInP, the dots are comparable to the wavelength of electrons and holes in the material, so that the inclusions act as quantum dots.

Figure 9F:
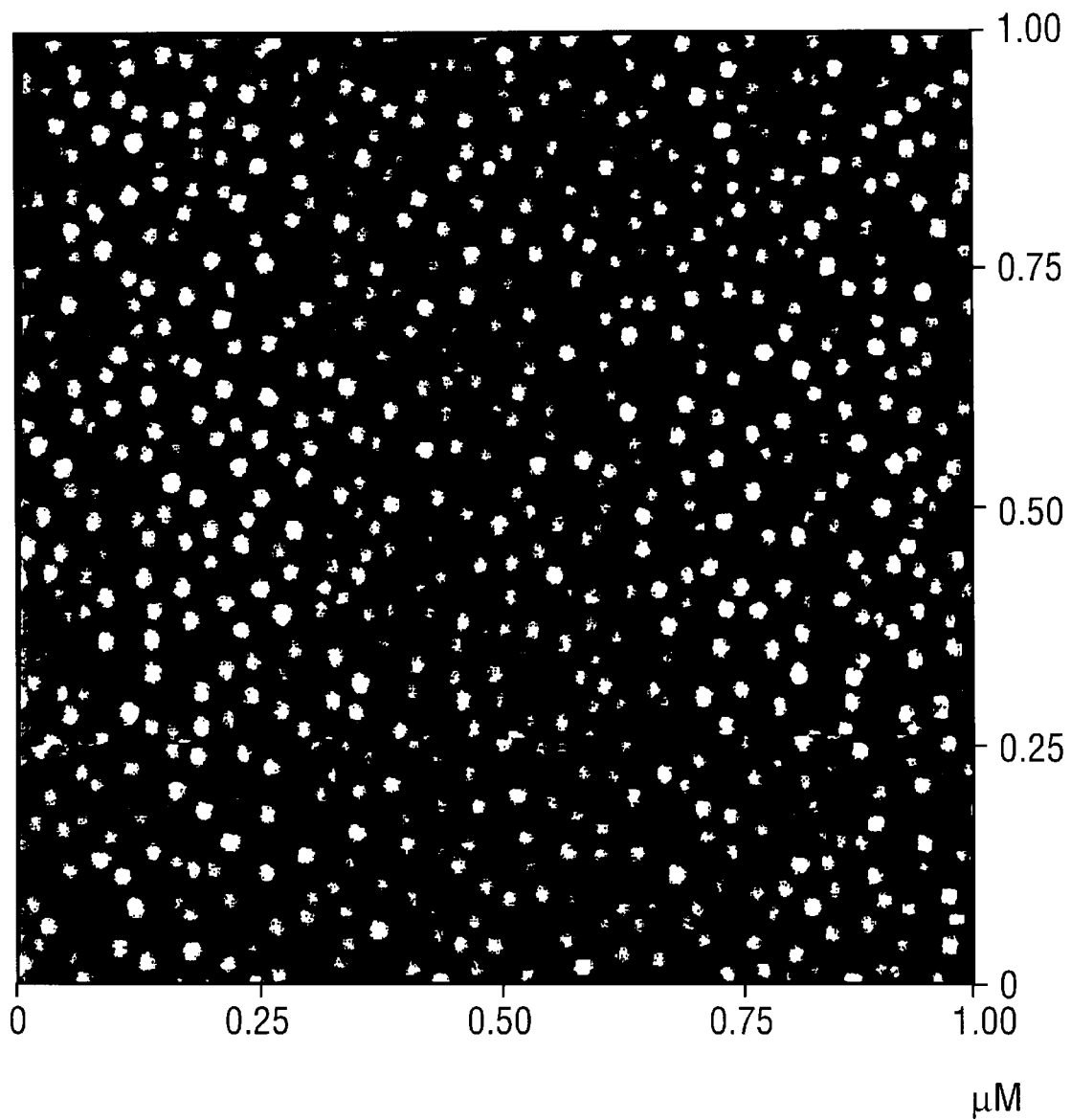

Specifically, measurements on MBE-grown InAs/GaAs quantum dots indicate that they are well suited for use in a photon turnstile device. FIG. 9f shows an atomic-force-microscope image of several self-assembled InAs/GaAs quantum dots. The dots have average base widths of about 20 nanometers and heights of about 4 nanometers, so that the quantum confinement of carriers in the dots is quite strong. This confinement gives well-separated electron and hole energy levels, so that light is emitted with a wavelength of about 950 nandmeters. This is a near-infrared wavelength, useful for experiments and for optical communications. The emission wavelength, as well as the size and spacing of the dots, can be controlled by the MBE growth conditions, making this a flexible system for engineering different turnstile devices.

It is straightforward to incorporate the self-assembled dots into the resonant-tunneling and cavity structure described above. All of the layers in the structure, including the heavily doped carrier reservoirs, the tunnel barriers, and the distributed Bragg reflectors, can be grown epitaxially by MBE or MOCVD. Growth of the dots is then simply one additional step in the growth process.

Once the dots and surrounding structure have been grown, devices must be fabricated containing isolated quantum dots and electrical contact pads. This fabrication process is described next, and is similar to that used to fabricate the previous turnstile device.

The first step is to make an electrical contact to the n-type layer 902, which lies underneath the dot layer 904 of a self-assemble quantum dot with respect to FIG. 9e. This is accomplished using standard techniques of optical lithography. First, a large hole is etched through the layers above the n-type layer. Metal is deposited in the bottom of this hole and nowhere else using the lift-off technique. The metal is a combination of gold, nickel and germanium, and must be annealed at 450 degrees Celsius, so that the contact will be Ohmic (having an ordinary linear conductance, rather than rectifying, diode like behavior).

Next, a single dot is isolated from the large ensemble, for subsequent use in a photon turnstile device. The preferred method for this isolation is to etch small posts in the sample that contain, on average, one single dot. This can be done using standard, well-developed semiconductor processing techniques.

Figure 10:
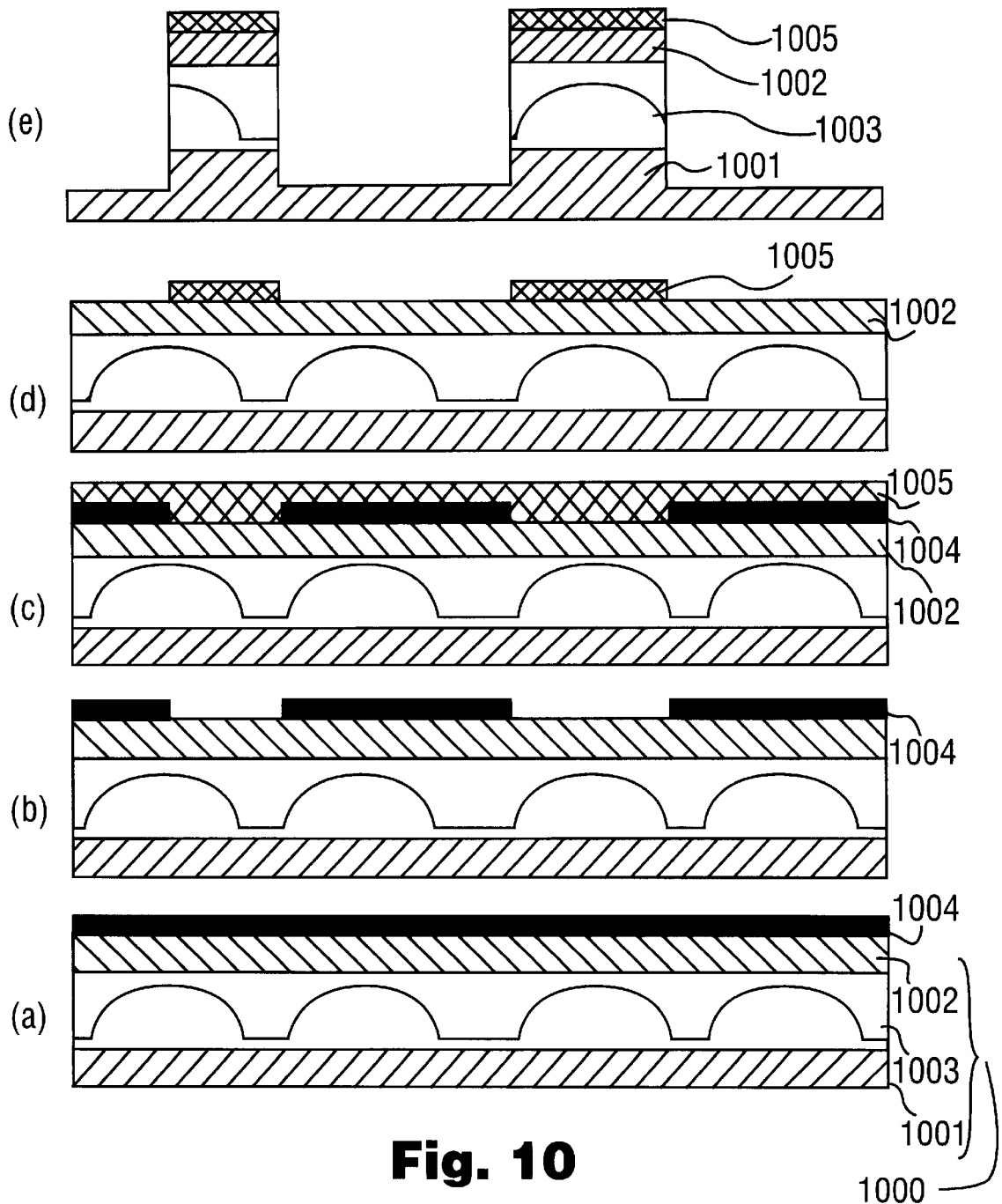
FIGS. 10a–e are schematic diagrams showing series of processing steps involved in fabricating posts to isolate single self-assembled quantum dots according to another embodiment of the present invention.

FIG. 10 shows schematically a possible series of processing steps to make such microscopic posts using electron-beam lithography and dry etching. In FIG. 10a, a layer of electron-beam resist 1004 is put down on the top of a self-assembled semiconductor quantum dot layered structure 1000 of the type depicted in FIG. 9e. The structure 1000 includes a n-type semiconductor layer 1001, an entire epitaxially intrinsic semiconductor layer 1003 containing the quantum dots disposed on top of the layer 1001, and a p-type semiconductor layer 1002 disposed on top of layer 1003. The material of the resist layer 1004 is similar to a photosensitive medium, except that its response is to electron beams rather than light, such as polymethylmethacrylate (PMMA). It is possible to use an electron beam to write patterns on it, using a modified electron microscope. This pattern will remain behind when the resist is developed using an appropriate developer chemical, as illustrated in FIG. 10b. For the present device, the pattern typically includes a set of small pads, with diameters of approximately 0.1 micrometers.

After the pattern has been produced a layer of metal 1005 is deposited on top of the structure, as shown in FIG. 10c.

This metal is a combination of chromium and gold, and will serve as part of the p-type electrical contact. The metal layer 1005 is typically applied by vacuum evaporation or sputtering. The resist layer 1004 is then chemically dissolved. For example, acetone is typically used to dissolve PMMA. The metal 1005 above the resist layer 1004 is removed, while the metal 1005 that was deposited into the holes remains behind. This lift-off process is illustrated in FIG. 10d. The remaining is a set of metallic pads 1005 on the surface of the sample, with approximately the same 0.1-micrometer diameter as the original electron-beam pattern.

Figure 11:
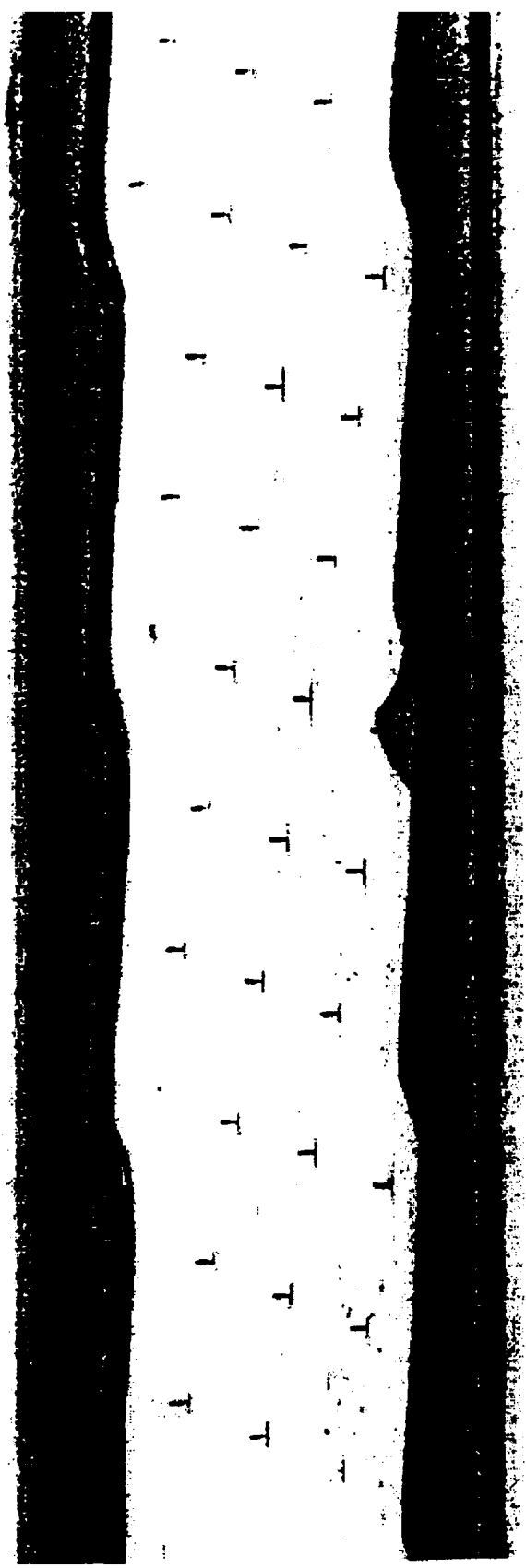
FIG. 11 is a scanning-electron microscope image of the microposts containing quantum dots of FIG. 10 inside distributed Bragg reflector (DBR) cavities.

Next, the sample is subjected to etching. In this process, the semiconductor material is chemically or physically removed. The portions of the sample below the metal pads 1005, though, are protected. This means that the pattern on the surface is transferred to a relief pattern on the sample. For the present device, this means that a set of 0.1-micron-diameter posts is etched into the sample, as shown in FIG. 10e. In order to produce small posts with high aspect ratios and high-quality etched surfaces, a high-quality dry etching process, such as electron-cyclotron resonance dry chemical etching, is typically used. Using this method, it is possible to etch through all the layers of the structure, so that each post contains a resonant-tunneling structure as well as the top DBR of the optical cavity. A scanning-electron microscope image of such posts containing quantum dots inside of microcavities is shown in FIG. 11.

Figure 12:
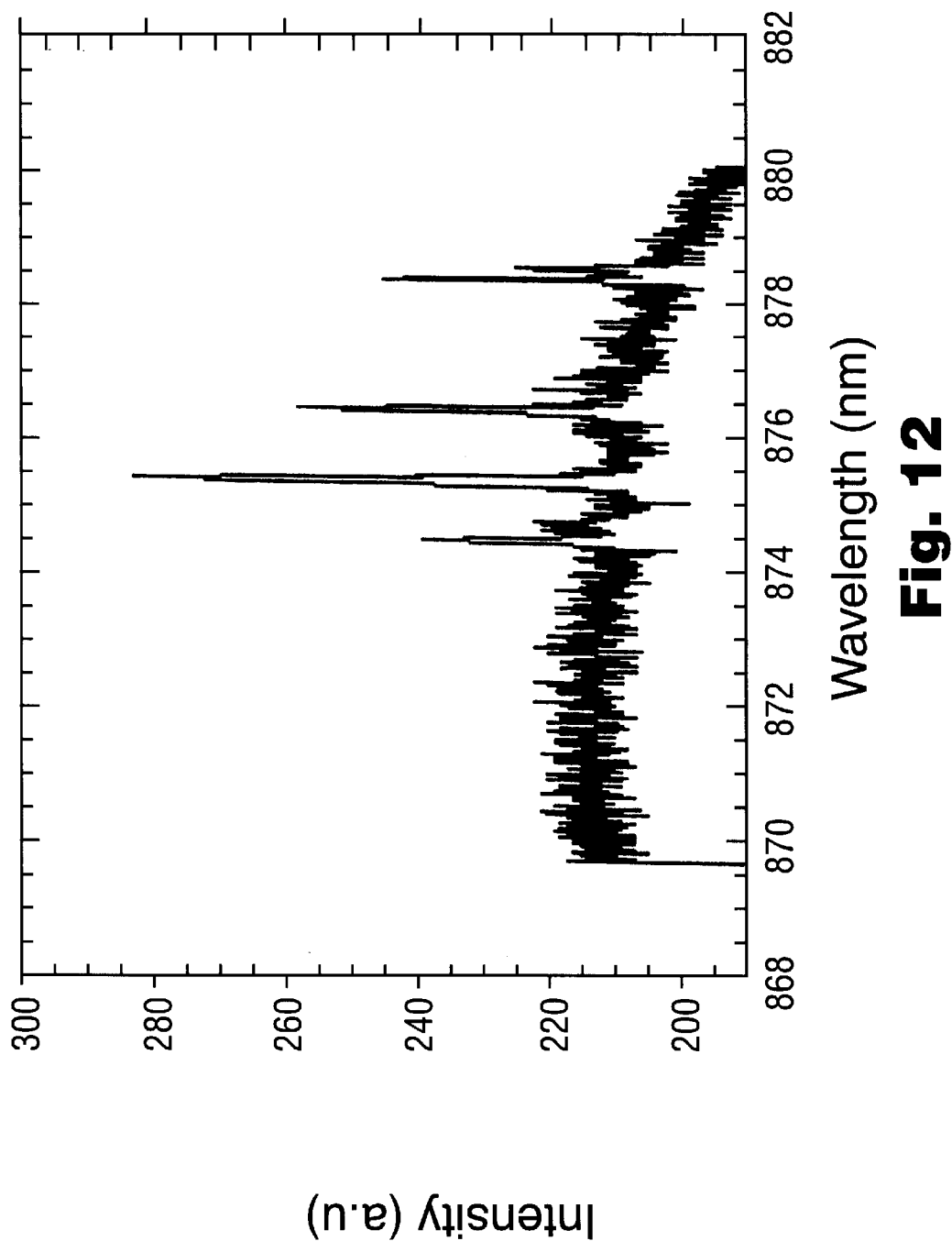
FIG. 12 is a spectrum of the intensity of the light versus wavelength given off by a single quantum dot in a microscopic post structure of FIG. 10.

It is necessary to probe the posts in order to determine which ones contain a single quantum dot. One way to test the posts is to shine a laser with large energy on one post at a time. This will create electrons and holes in the sample, which can subsequently be captured in a dot and recombine to give off photons. If the light given off is collected and analyzed in terms of its wavelengths, a series of narrow, discrete peaks will be seen, corresponding to ground state emission with various numbers of electrons and holes in the dot. A result of such a photoluminescence experiment is shown in FIG. 12. These characteristic peaks will, of course, be absent if there is no dot in the post. Thus, the posts that are useful for the turnstile device can be identified.

Figure 13:
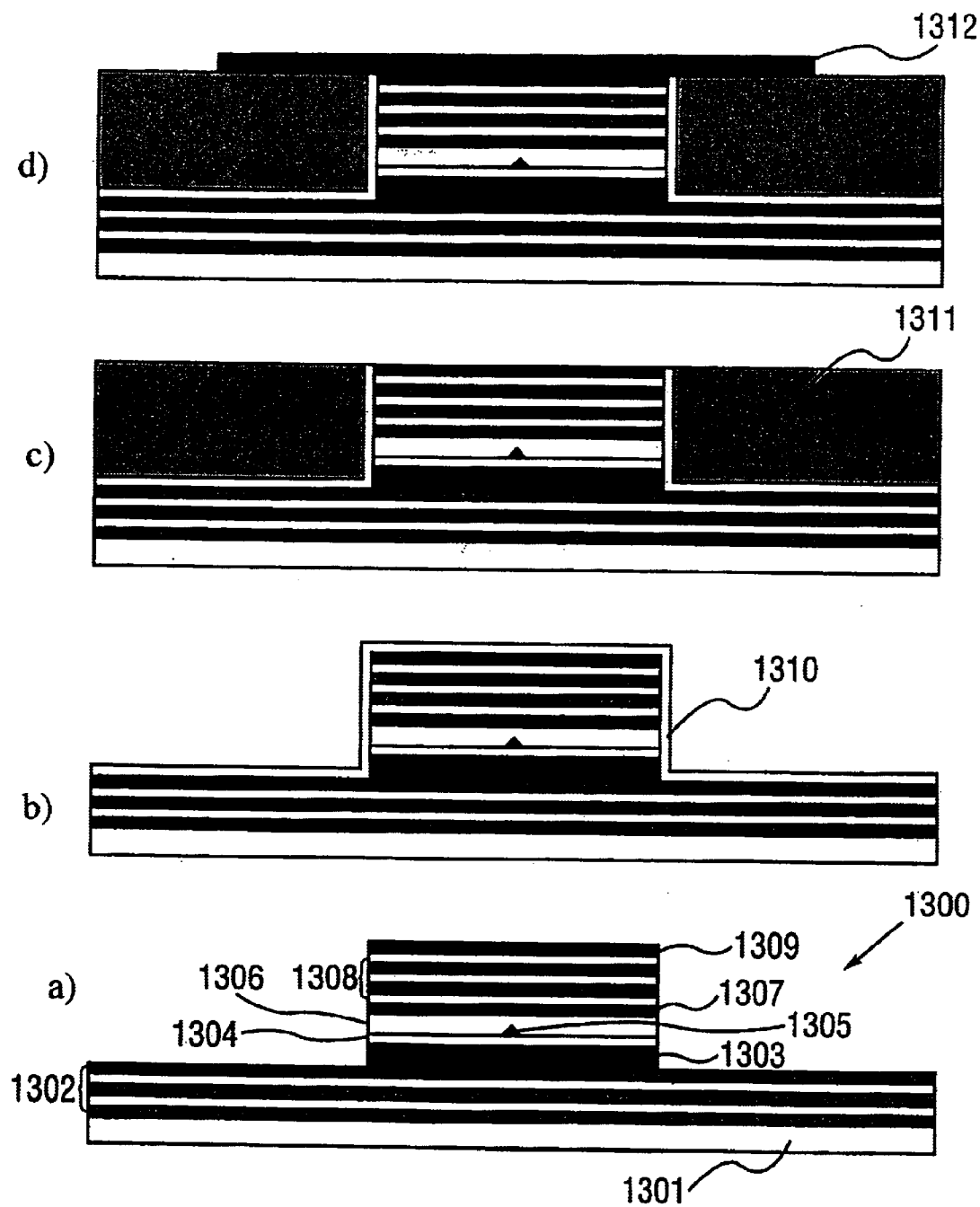
FIGS. 13a–d are schematic diagrams showing the processing steps involved in making electrical contacts to the microscopic post of FIG. 10.

Once the posts have been made and characterized, the remaining fabrication steps are usually surface passivation and creating electrical connections to the top of the posts. The steps in a possible process are indicated in FIG. 13. FIG. 13a depicts a post 1300 having a structure similar to the structure of the device referring to FIG. 7, which is created using methods described in FIGS. 9 and 10. Post 1300 includes a quantum dot 1305 embedded in an intrinsic region disposed between two tunnel barriers 1304 and 1306 which are adjacent to a n-type reservoir 1303 and p-type reservoir 1307 and two mirrors 1302 and 1308 of a distributed-Bragg-reflector (DBR) cavity formed by layers of dielectric material with alternating high and low indices of refraction. The device also includes an Ohmic contact 1309 and a gallium arsenide substrate 1301. The post 1300 is surface-passivated using, for example, a solution of sulfur in ammonium sulfide at 60 degrees Celsius, and immediately encapsulated with a silicon nitride film 1310, which is shown in FIG. 13b. This surface passivation procedure dramatically reduced leakage current in test structures and was necessary for successful demonstration of the previous single-photon turnstile device. Next, the sample is planarized, as illustrated in FIG. 13c, which can be done, for example, by putting down a layer of photcresist 1311 and then heating the sample to about 150 degrees Celsius for 20 minutes. The heating causes the resist 1311 to flow, filling in the spaces between the posts. The resist layer 1311 hardens, so it will not be affected in subsequent processing steps, and becomes more insulating. If necessary, the surface of the resist 1311 can be removed by etching, so that the tops of the posts are exposed. Finally, the silicon nitride 1310 is etched away from the tops of the posts, exposing the gold-chromium contact 1309, and large contact pads 1312 are put down, as indicated in FIG. 13d. These contact pads must be large enough to allow wires to be attached.

Figure 14:
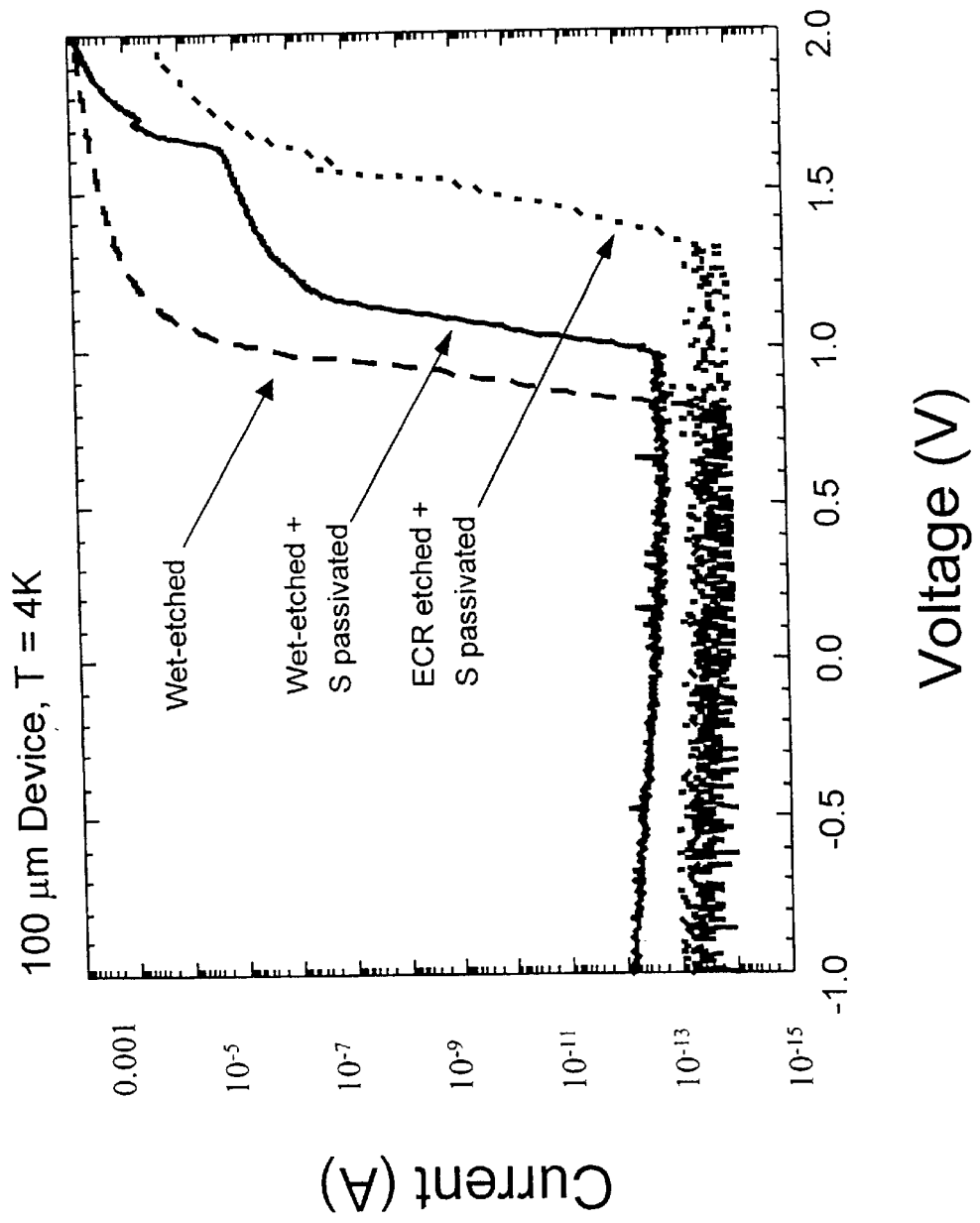
FIG. 14 is a graph illustrating current-voltage characteristics at a temperature of 4 K for the test mesas fabricated with various etching methods.

FIG. 14 is a graph illustrating current-voltage characteristics at a low temperature of 4 K for the test mesas fabricated with various etching methods. Electron-cyclotron resonance dry chemical etching, combined with sulfur passivation, generally yields the lowest leakage current.

The quantum-dot photon turnstile device presents several advantages over previously demonstrated and proposed devices for producing single photons and photon pairs. The photon stream it emits is well-regulated, consisting of single photon pairs separated by well-known time intervals. This is a distinct advantage over attenuated lasers, LED's, and spontaneous parametric downconversion, where the number of photons or photon pairs per pulse is random. Another advantage of the device is its small sizze and ease of use. Once the device is made and characterized, all that needs to be done to use it is simply to connect an appropriately modulated voltage source. As well, the device is very compact, allowing it to be easily incorporated into any experiment or technological application. This is clear improvement over the single-atom or single-molecule devices, as well as the nonlinear-cavity set up.

Furthermore, the photons produced by the device can be collected efficiently, enabling their use in experiments and applications. Since the photons are emitted in a well-defined direction and into a single optical mode, they can be coupled efficiently into an optical fiber, This is a distinct improvement over the single-atom and trapped ion experiments, as well as the SAW-pumped quantum dot, and previous photon turnstile devices, where emission is into random directions. In addition, since the photons are emitted at a wavelength for which the substrate is transparent, absorption losses will be low. Absorption in the substrate was another difficulty with previous photon turnstile devices.

Further, it is straightforward to modify the rate of photon emission from the quantum-dot photon turnstile device: all that needs to be changed is the frequency of modulation of the voltage source. Changing the photon emission rate is generally not as simple in other single-photon devices.

Another advantage of the device is the use of a quantum dot allowing operation at a higher temperature than previously possible. The temperature of operation is limited by the consideration that the Coulomb blockade energy must be larger than the thermal energy (the energy equivalent of the device temperature). This limited operation of the previous photon turnstile device to very low temperatures. The Coulomb blockade energy will be much higher in a quantum dot, due to the low capacitance of the structure. In fact, the small size of indium arsenide self-assembled quantum dots means that their Coulomb blockade energy can be as high as 20 milli-electron Volts. This may allow operation of the device at liquid-nitrogen temperature, a distinct improvement in terms of flexibility and ease of use. Also, the use of an external cavity will reduce the amount of time that an electron and hole will reside together in the dot before recombining to produce a photon. A reduction of electron-hole pair lifetime is already provided by use of a quantum dot as compared to a quantum well: the reduced size of the confinement region means that the electron and hole spend more time near each other, and thus recombine more quickly. Speeding up the recombination rate means increasing the maximum frequency at which the device can reliably operated. In other words, the present device can emit more regulated photons per unit time then the previous turnstile devices. This will mean faster experiments and increased communication rates in applications.

Another advantage of the device is that the device can be used to produce either a regulated and directed single photon stream or a regulated and directed stream of pairs of photons with opposite and possibly entangled circular polarizations.

It will be clear to one skilled in the art that the above embodiment may be altered in many ways without departing from the scope of the invention. Accordingly, the scope of the invention should be determined by the following claim.

What is claimed is:

1. A method for producing a single pair of photons with opposite circular polarizations comprising:
   a) providing a quantum dot embedded in a tunneling structure, wherein the quantum dot has discrete electron energy levels; and wherein the resonant tunneling structure comprises an electron hole reservoir region, an electron reservoir region, and tunnel barrier regions separating the quantum dot from the electron hole reservoir and from the electron reservoir region;
   b) coupling said quantum dot into an optical cavity;
   c) applying an electron bias voltage $V_e$ to said tunneling structure producing a resonant electron tunneling condition between the electron reservoir region and said quantum dot such that two electrons with opposite spins tunnel through said tunneling structure into a lowest electron energy level of said quantum dot; and
   d) applying a hole bias voltage $V_h$ to said tunneling structure to produce a resonant hole tunneling condition between the electron hole reservoir and said quantum dot such that two holes with opposite spins tunnel through said tunneling structure into a lowest hole energy level of said quantum dot and recombine with said electrons to emit said single pair of photons with opposite circular polarizations;
   wherein said emitted photons are directed into one direction by said optical cavity.

2. The method of claim 1, wherein said electron bias voltage $V_e$ is selected to maximize the tunneling probability of both said two electrons.

3. The method of claim 1, wherein said hole bias voltage $V_h$ is selected to maximize the tunneling probability of both said two holes.

4. The method of claim 1, wherein the optical cavity is selected from the group consisting of distributed-Bragg-reflector cavity (DBR), microsphere cavity, Fabry-Perot cavity, simple post, metal-coated simple post, and photonic band gap lattice.

5. The method of claim 1, wherein said quantum dot has average base widths of about 20 nanometers and heights of about 4 nanometers.

6. The method of claim 1, wherein said steps c) through d) are repeated to produce the photon pairs at regular intervals.

7. The method of claim 6, wherein an emission rate of said photon pairs is changed by adjusting a voltage modulation frequency.

8. The method of claim 1, wherein said tunneling structure is a resonant tunneling structure.

9. The method of claim 8, wherein said resonant tunneling structure comprises an intrinsic semiconductor layer disposed between a p-type doped semiconductor layer and a n-type doped semiconductor layer, and wherein said quantum dot is embedded in said intrinsic semiconductor layer.

10. The method of claim 9, wherein said intrinsic semiconductor layer comprises a narrow-gap material surrounded by a wide-gap material, selected from the group consisting of GaAs/InAs/GaAs, Si/Ge/Si, GaN/InGaN/GaN, and GaInP/InP/GaInP.

11. The method of claim 9, wherein said p-type doped semiconductor layer and said n-type doped semiconductor layer comprise material selected from the group consisting of GaAs, AlGaAs, Si, GaN, and GaInP.

12. The method of claim 11, wherein said p-type doped semiconductor layer and said n-type doped semiconductor layer comprise the same material.

13. The method of claim 9, wherein said intrinsic material surrounding said quantum dot forms tunnel barriers, which separate said p-type doped and n-type doped semiconductor layers from said quantum dot.

14. The method of claim 13, wherein thicknesses of said tunnel barriers are selected such that said two electrons and said two holes tunnel into the electron ground state and the hole ground state respectively.

15. A method for producing a single pair of photons having opposite circular polarizations, the method comprising:

applying an electron bias voltage to a semiconductor material comprising an i-type region between a p-type region and an n-type region, and a quantum dot embedded in the i-type region, wherein the quantum dot has discrete electron energy levels, and wherein the electron bias voltage establishes a resonance tunneling condition between the n-type region and a lowest electron energy level of the quantum dot;

allowing two electrons with spins ½ and −½ to tunnel from the n-type region to the lowest electron energy level of the quantum dot, wherein tunneling of additional electrons at the electron bias voltage is prohibited by the Pauli exclusion principle;

applying a hole bias voltage distinct from the electron bias voltage to the semiconductor material, wherein the hole bias voltage establishes a resonance tunneling condition between the p-type region and a lowest hole energy level of the quantum dot;

allowing two holes with spins 3/2 and −3/2 to tunnel from the p-type region to the lowest hole energy level of the quantum dot, wherein tunneling of additional holes at the hole bias voltage is prohibited by the Pauli exclusion principle;

generating in the quantum dot a pair of photons with opposite circular polarizations through combination of the two electrons with the two holes, wherein a first photon with right-handed circular polarization is generated from the spin ½ electron and spin 3/2 hole, wherein a second photon with left-handed circular polarization is generated from the spin −½ electron and spin −3/2 hole;

emitting the pair of photons in a predetermined direction by positioning the semiconductor material within a high finesse optical cavity tuned to a wavelength of the photons such that the pair of photons are generated in a single mode of the cavity.

16. The method of claim 15 wherein a spin-relaxation time for electrons and holes in the quantum dot are longer than an electron-hole recombination time in the quantum dot; wherein the electron-hole recombination time in the dot is longer than a hole tunneling time of the semiconductor material; and wherein the electron bias voltage and the hole bias voltage are selected to maximize a tunneling probability of two electrons and two holes, respectively, into the quantum dot.

17. A quantum-dot photon turnstile device comprising:

a) a high finesse optical cavity tuned to a predetermined photon wavelength;

b) a resonant tunneling structure positioned within the optical cavity, wherein the resonant tunneling structure comprises an electron hole reservoir region, an electron reservoir region, and tunnel barrier regions;

c) a quantum dot embedded in the resonant tunneling structure such that the tunnel barrier regions separate the quantum dot from the electron hole reservoir region and from the electron reservoir region, wherein the quantum dot has discrete electron energy levels;

d) a voltage bias modulator electrically coupled to the electron hole reservoir region and to the electron reservoir region, wherein the voltage bias modulator switches between an electron bias voltage and a hole bias voltage, wherein the electron bias voltage causes two electrons of opposite spins to resonantly tunnel from the electron reservoir region into a lowest electron energy level of the quantum dot, and wherein the hole bias voltage causes two holes of opposite spins to resonantly tunnel from the electron hole reservoir to the quantum dot;

whereby the two holes of opposite spin recombine in the quantum dot with the two electrons of opposite spin to emit a single pair of photons with opposite circular polarizations directed into one direction by the high finesse optical cavity.

* * * * *